(12) United States Patent
Blokhuis

(10) Patent No.: US 7,784,341 B2
(45) Date of Patent: Aug. 31, 2010

(54) LIQUID MONITORING APPARATUS AND METHOD OF USING SAME FOR CONTAINERS

(76) Inventor: Peter C Blokhuis, 205 Seneca Pkwy., Rochester, NY (US) 14613

( * ) Notice: Subject to any disclaimer, the term of this patent is extended or adjusted under 35 U.S.C. 154(b) by 121 days.

(21) Appl. No.: 11/736,878

(22) Filed: Apr. 18, 2007

(65) Prior Publication Data

US 2007/0245824 A1 Oct. 25, 2007

Related U.S. Application Data

(60) Provisional application No. 60/793,265, filed on Apr. 19, 2006.

(51) Int. Cl.
*G01F 23/30* (2006.01)
(52) U.S. Cl. ....................................................... 73/308
(58) Field of Classification Search ........... 73/313–314, 73/305–309
See application file for complete search history.

(56) References Cited

U.S. PATENT DOCUMENTS

| 3,450,206 | A | * | 6/1969 | Watkins ....................... 166/329 |
| 3,941,861 | A | * | 3/1976 | Hamalainen et al. .......... 261/19 |
| 4,279,078 | A | | 7/1981 | Hinshaw et al. |
| 4,281,554 | A | * | 8/1981 | Rosaen ..................... 73/861.71 |
| 4,461,328 | A | * | 7/1984 | Kenney ........................ 141/67 |
| 4,748,300 | A | * | 5/1988 | Anderson ................. 200/84 C |
| 4,800,372 | A | * | 1/1989 | Poteet ......................... 340/625 |
| 5,065,139 | A | * | 11/1991 | Shefsky ...................... 340/620 |
| 5,265,344 | A | | 11/1993 | Streimer et al. |
| 5,999,101 | A | | 12/1999 | Gallagher |
| 6,337,632 | B1 | | 1/2002 | Dickie et al. |
| 6,414,598 | B2 | | 7/2002 | Freill et al. |
| 6,480,113 | B1 | | 11/2002 | Esposito |
| 6,727,822 | B2 | | 4/2004 | Chamberlin et al. |
| 2003/0131662 | A1 | * | 7/2003 | Lease ........................... 73/313 |

\* cited by examiner

*Primary Examiner*—John Fitzgerald

(57) ABSTRACT

A liquid level sensing device that gives an audible and visual alarm when a low or high liquid level condition in a chemical container is detected. A float switch located at the bottom end of the device closes an electrical circuit, which starts an audio alarm and flashing light. The unit includes an integral liquid feeding tube for dispensing liquid to a process, which optionally incorporates a flow-indicator.

16 Claims, 3 Drawing Sheets

LIQUID MONITORING APPARATUS AND METHOD OF USING SAME FOR CONTAINERS

REFERENCE TO RELATED APPLICATIONS

This application claims one or more inventions which were disclosed in Provisional Application No. 60/793,265, filed Apr. 19, 2006, entitled "BATTERY OPERATED LIQUID LEVEL ALARM". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of liquid level sensing. More particularly, the invention pertains to an apparatus and method for the detection of low liquid levels in containers to produce an audible and/or visual alert indicative of a low liquid level condition in such containers.

2. Description of Related Art

Chemical processes are often fed automatically using pumps which are activated based on some property of the process such as time, production workload, or a monitoring device which could be either gravimetric, colorimetric, pH, or ORP-based for example. As the process requires it, chemicals are dispensed from a container such as a standard 55-gallon drum. If the contents of the drum are depleted, the process may be harmed or defective product may be produced. To avoid this, chemical process operators must be always on alert. One possible way around this taxing burden is to have a dedicated permanent "day tank" which is equipped with a permanent alarm, but this requires the effort of having to pump possibly toxic or dangerous chemicals into the "day tank", and it takes up space. It is much more convenient to feed chemicals directly out of the containers they are shipped in. Therefore, the need exists to automatically alert the process operators when such containers are empty.

One class of inventions represented by CHAMBERLAIN et al. U.S. Pat. No. 6,727,822 comprises a float that responds to changing liquid level by closing an electrical circuit. In industrial manufacturing environments, this reliance on 120 volt power is unreliable, or in wet environments, possibly dangerous to the operator.

Alternatively, many level detection devices to date have relied on conductivity probes to detect low liquid level as in:
DICKIE et al. U.S. Pat. No. 6,337,632,
HINSHAW et al. U.S. Pat. No. 4,279,078
SHEFSKY U.S. Pat. No. 5,065,139
HOHMNAN U.S. Pat. No. 6,873,263

Conductivity probes must be made from conductive metal and therefore the potential exists for chemicals contained in the drum to attack or foul the probes—leading to failure. Also, while these probes may be satisfactory for conductive liquids, they are useless for non-conductive liquids. Conductive probes have the further disadvantage that they must consume power to do frequent checking of the level. In a battery-operated device where power conservation is vital, this is a substantial disadvantage. Moreover, conductivity probes are prone to failure if enough condensation or splashed liquid is present on the probes to provide a conductive path. In this failure mode, an alarm would not be given when a drum is actually empty.

A different approach that avoids this parasitic power consumption is that of SHUKLA et al. U.S. Pat. No. 5,767,775 which describes a mercury switch and transmitter entombed in a Teflon™ cone, however this device is not easily retrieved from the interior of portable containers such as a chemical drums (if it could be made to fit in the bung hole in the first place) which makes it unsuitable for constantly transferring to new incoming drums. In addition, there is no confirmation that the device is even in the drum that liquid is being drawn from, and no way to check that it is working properly in closed containers like drums. Furthermore, there is no way to adapt this device to sense high liquid levels. Checking the function of the device is difficult or impossible. Other float type inventions are that of GALLAGHER U.S. Pat. No. 5,999,101 which describes a float which activates an alarm outside the container, however it consists of an unwieldy and cumbersome apparatus inside the container that is suitable only for permanent mounting in tanks—not to be moved from drum-to-drum. Doing a functional check of the unit is impossible without reaching down into the tank and picking up the float.

FREILL et al. U.S. Pat. No. 6,414,598 describes a battery-operated and float device suited for shallow pans. It could conceivably be adapted for use with chemical drums if the float could be made to fit inside the bung hole of a drum, and conceivably it could be made to operate in a low level mode, (instead of high level) and possibly the electronics could be even encased in a chemical-proof housing, but it has no flashing light—which is essential in a factory environment which might have dozens of alarms all within earshot. Further, the float height is adjustable, and this degree of operator discretion is unwelcome in a factory where standardization is the goal. Finally, the device with its exposed string is simply nowhere near robust enough for industrial use.

Also lacking a flashing light, is the invention of ESPOSITO U.S. Pat. No. 6,480,113. The floating member makes a direct electrical connection in the alarm circuit. This exposed electrical contact would not be nearly reliable enough in a factory setting with corrosive fumes; the design of the float sliding within the electrical housing precludes sealing against these corrosive fumes. Further, the level-sensing member is not nearly long enough to sense liquid at the bottom of a drum.

None of the prior art provides any way to ensure that the suction tube is located in the drum with the alarm, and no way to ensure that the suction tube is at the correct depth. (Which must be below the level of the float, or the process may be starved for chemicals for some time before an alarm is given) Finally, none of the prior art provides a convenient means of monitoring the flow of liquid from a level-alarming device.

SUMMARY OF THE INVENTION

The present invention provides several advantages over the art discussed above:
a) The apparatus of the present invention may be conveniently and quickly moved from container to container.
b) The apparatus of the present invention has no parts that are fouled or degraded by the chemicals it is monitoring.
c) The apparatus of the present invention preferably has its own power source for maximum reliability.
d) There is no parasitic power drain on the power source—just the power spent actually providing an alarm.
e) The apparatus of the present invention guarantees that the level alarm is monitoring the same tank that chemical is being pumped out of. (By having the suction tube permanently joined to the alarm device).
f) The apparatus of the present invention optionally provides a convenient flow-monitoring device in the same unit.

g) The apparatus of the present invention is robust, and suitable for corrosive and hostile industrial environments.

h) With the apparatus of the present invention a functional check of the operation (not just a circuit test) can be done easily.

i) The apparatus of the present invention ensures that the point of liquid suction is below the level of the level sensor (float) tripping point.

j) The apparatus of the present invention functions equally well in non-conductive liquids.

Still further advantages will become apparent from a consideration of the ensuing description and drawings.

DETAILED DESCRIPTION OF THE INVENTION

Figure 1:
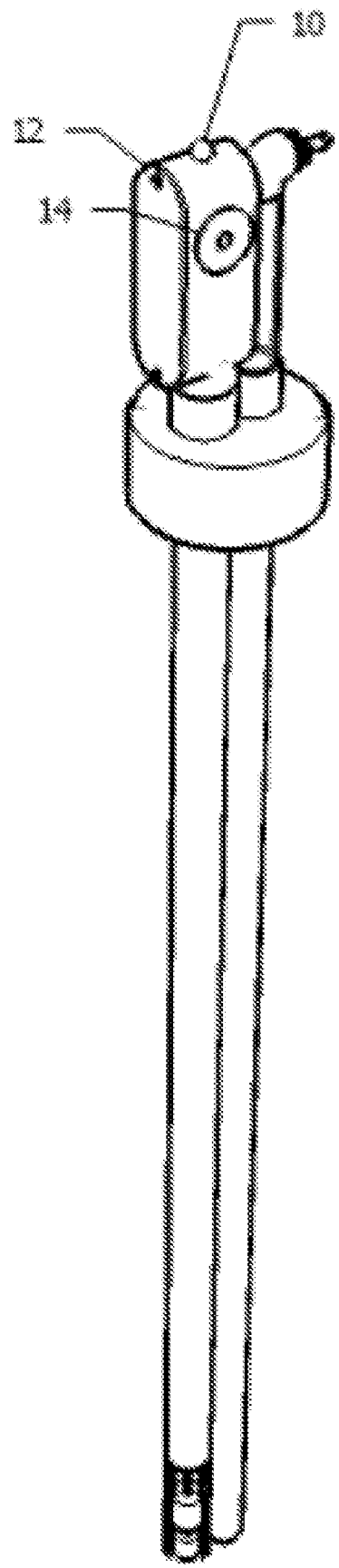
FIG. 1 shows a perspective view of the invention.
Figure 2:
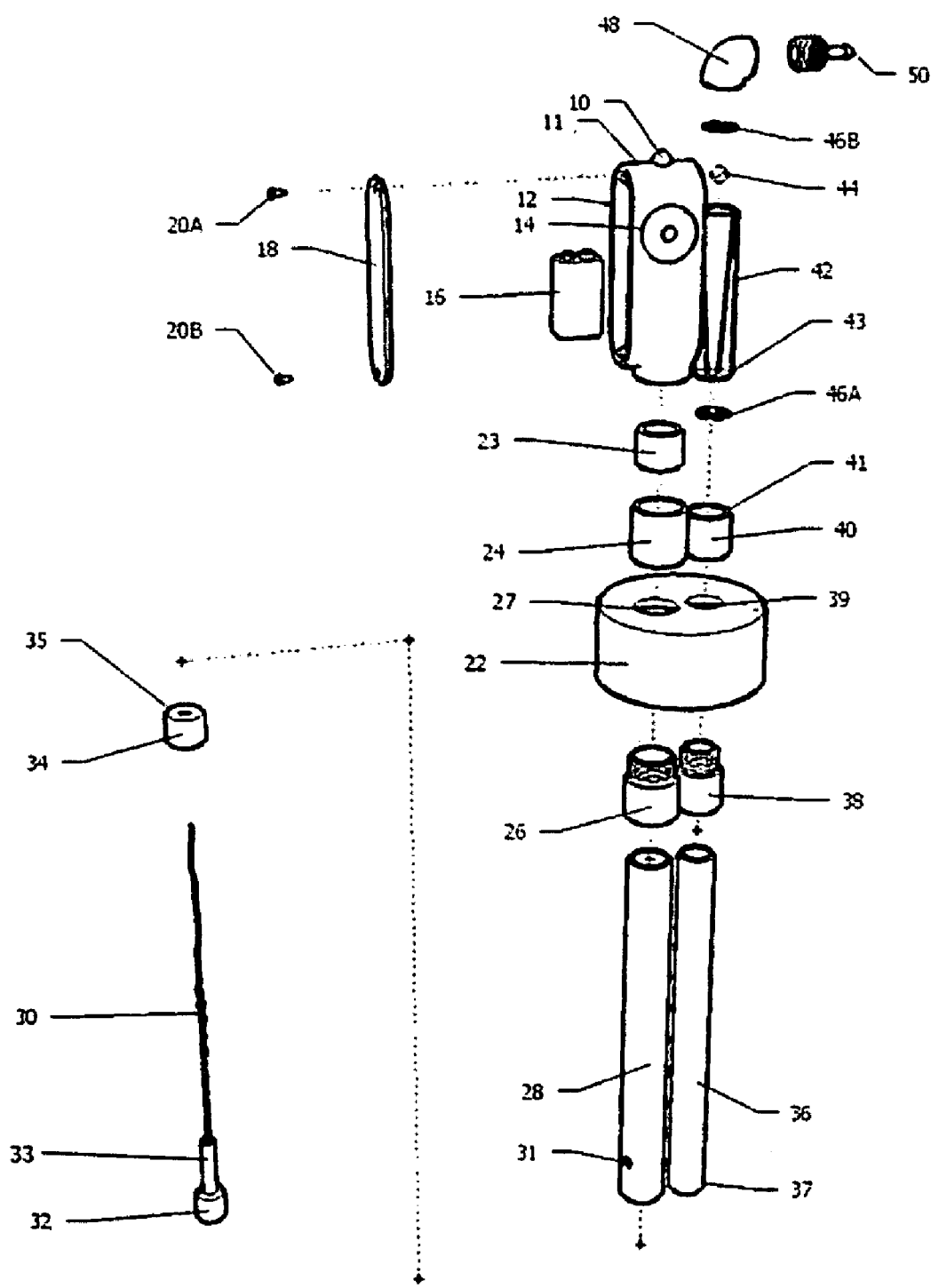
FIG. 2 shows an exploded view of the invention.
Figure 3:
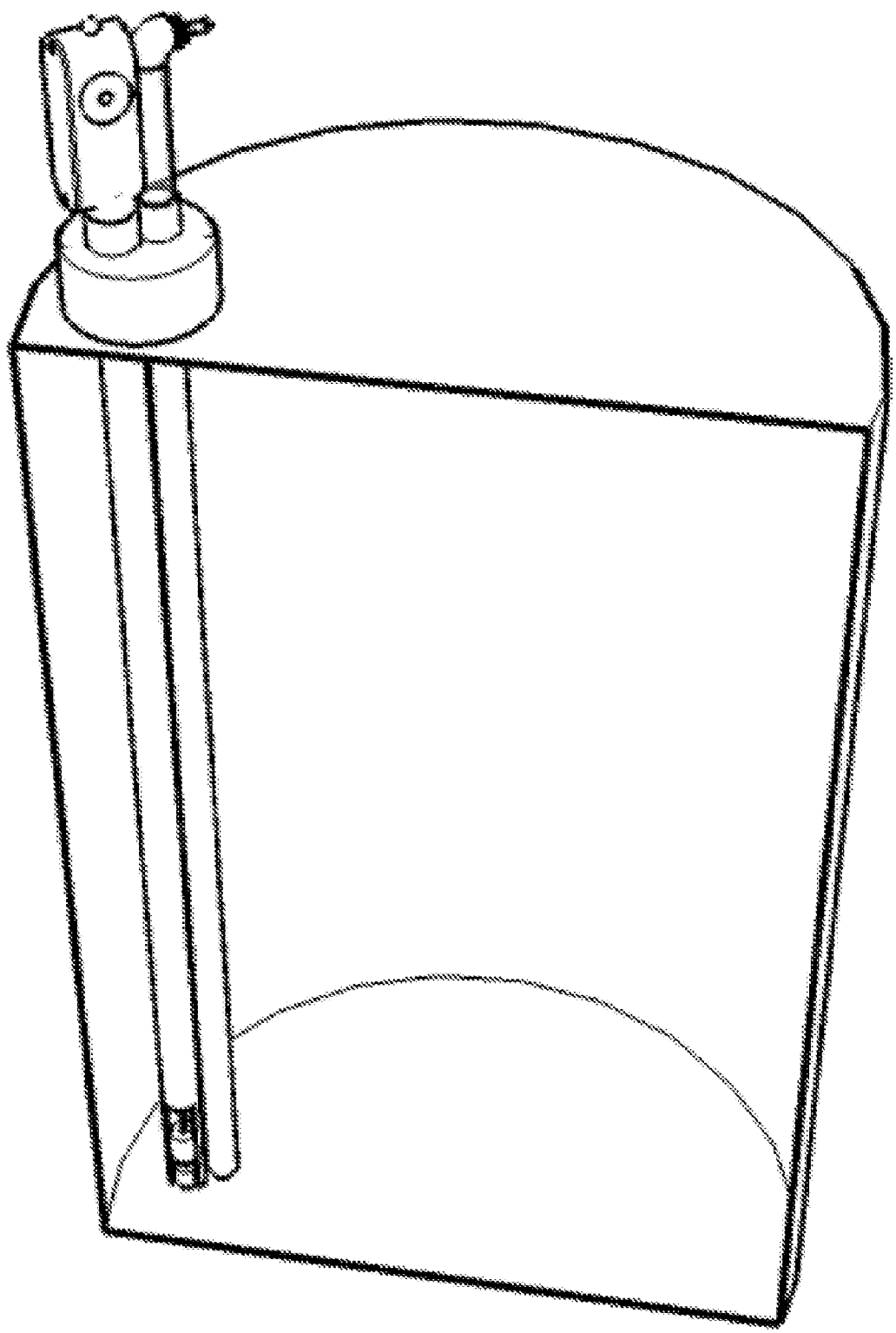
FIG. 3 shows an embodiment of the invention deployed in a typical liquid containing drum.

Details of a preferred embodiment of the present invention are illustrated in FIGS. 1 and 2. A liquid level sensing apparatus 8, in accordance with the invention has a visual indicator 10 comprising a light, which is preferably a light emitting diode (LED). This diameter light source may be provided by either employing a large diameter LED or, optionally, encasing one or more smaller LEDs in a large diameter translucent dome for increased visibility and for protection from the elements. Preferably, the visual indicator 10 is located at a highest point 11 of the apparatus 10 to allow good visibility from any angle. An LED of sufficient size to be readily seen, at least 2 mm in diameter to as large as 40 mm is preferred. A presently preferred embodiment of the invention would have a light source of at least 10 mm diameter. Furthermore, for additional visibility, the LED could blink. This might consist of alternating or rotating different colors, or simply of blinking on and off. The visual indicator 10 is mounted in a recess or hole in an electronics enclosure 12. Visual indicator 10 may optionally be sealed in place with a chemically resistant sealant such as epoxy resin if water resistance is required. Electronics enclosure 12 may be of any suitable design as is known to the art, and is preferred to be made of a chemically resistant material such as PVC. In a preferred embodiment electronics enclosure 12 may be a PVC conduit body such as is manufactured by Cantex Inc., their part number 5133152.

Referring now to FIG. 2 there is also mounted in the electronics enclosure 12 an audible alarm 14. In a preferred embodiment this audible alarm may consist of a piezo buzzer. In a further preferred embodiment, such a buzzer should have low power consumption, loud volume, and good corrosion resistance. One piezo buzzer suitable for audible alarm 14 is Floyd Bell Inc. part number TMW-86-530-W. Such an alarm could also have a silencing feature whereby the user touches the alarm to shut if off temporarily as with Floyd Bell Inc. part number OC-09-530-QO.

A power source such as a battery 16, to power energizable electronics to operate the visual indicator 10 and audible alarm 14 may be of any type as is well known to the art including direct AC power, an external AC or DC power supply, a solar cell, or preferably may consist of one or more batteries. In the embodiment of FIG. 2, a battery 16 is illustrated as the power source for energizable electronics of the apparatus.

In a preferred embodiment, the battery 16 (or batteries if more than one is used), the visual indicator 10, and the audible alarm 14 are all contained within or attached to the electronics enclosure 12. The wiring or other means used to connect these devices is thereby contained within and protected by the electronics enclosure 12. In addition, a pair of float switch leads 30 are preferably routed into the electronics enclosure so that all of the necessary electrical connections are protected within the electronics enclosure 12. In the specific embodiment illustrated in FIG. 2, the electronics enclosure 12 is sealed with a cover 18 which is retained with fasteners 20A and 20B. Obviously, any electronics enclosure as is well known in the art could be similarly employed to perform the same function as electronics enclosure 12, and it is to be understood that such enclosures may have other closure means or, for some applications, may be permanently sealed.

The liquid level sensing apparatus 8 optionally includes a mount. Such a mount should be designed to facilitate placement of the apparatus onto a container containing liquid, the level of which is to be monitored. In the embodiment illustrated in FIG. 2 the mount is in the form of a substantially cylindrical cap 22 however, in other embodiments, the mount might consist of a flat mounting plate or of one or more clips, magnets, clamps, suction cups, a stopper, a flange, or any other mounting means such as are known to the art. If no optional mounting means are provided, the apparatus may simply be placed through an opening in the container such that the lower ends of the sensor tube 28 and the liquid feeding tube 36 rest on or near the bottom of the container.

In the embodiment of FIG. 2 the electronics enclosure 12 is attached to cap 22 by means of a pipe 23 which in turn is attached to a female adapter 24. The female threads of adapter 24 mate with the male threads of a male adapter 26. The threads of the male adapter 26 extend upward through a hole 27 in cap 22. Attached to the bottom (socket end) of the male adapter 26 is the sensor tube 28. In a preferred embodiment pipe 23, threaded adapter 24, male adapter 26, and sensor tube 28 may be constructed from PVC pipe and fittings such as for instance ¾ inch diameter schedule 40 PVC pipe manufactured by J-M Manufacturing Co. One or more of these components could be made from other materials as necessary for a specific application; materials such as other plastics or metals could be used as chemical or impact resistance requires.

Sensor tube 28 serves to contain and protect the pair of float switch leads 30. A float switch 33 preferably has a magnetic float 32 and a reed switch to close the normally-open alarm circuit when the liquid level is low. In alternate embodiments the circuit can close on high liquid level instead. In a preferred embodiment, float switch 33 is attached to a plug 34 by means of pipe threads. Plug 34 is secured within sensor tube 28 and provides a liquid tight barrier through which the pair of float switch leads 30 pass. In a preferred embodiment constructed from PVC, plug 34 could be secured in sensor tube 28 by gluing. Plug 34 serves to mount float switch 33 securely within the sensor tube 28 and to prevent incursion of liquid into the (dry) electronics space beyond an upper end 35 of the plug 34. A hole 31 through the sensor tube 28 should be present above float switch 32 to allow air to escape so trapped air doesn't affect the buoyancy of float switch 33.

Still referring to FIG. 2, a liquid feeding tube 36 is immediately adjacent to sensor tube 28. Preferably, liquid feeding tube 36 is permanently attached to sensor tube 28 and to cap 22 as for example by gluing, welding, providing a brace, or by a combination of two or more of these. In a preferred embodiment, liquid feeding tube 36 is attached to cap 22 by means of a male adapter 38. Male adapter 38 is preferably located immediately adjacent to adapter 26. The male threads on male adapter 38 pass through a hole 39 in cap 22 and screw into the threads of a female adapter 40. Likewise, male threads of adapter 26 pass through hole 27 to engage with the female adapter 24.

In the embodiment shown in FIGS. 1 and 2, an optional transparent sight tube 42 is attached to an upper end 41 of the male adapter 38. This provides a convenient means of monitoring flow from the liquid feeding tube. In a presently preferred embodiment the sight tube 42 is made with a variable area inside and an object such as an inert ball 44 positioned inside of the sight tube 42 to serve as a means of indicating the flow rate when liquid is being drawn through liquid feeding tube 36. The ball 44 may be multicolored to provide for visibility in liquids of various colors. Additionally, a multicolored pattern provides improved visibility when ball 44 is randomly rotating while suspended in the liquid flow. Ball 44 is prevented from escaping said sight tube 42 by a screen mesh disc 46A, and a screen mesh disc 46B, each fixed at opposite ends of the sight tube 42. These discs 46A and 46B are inserted into the female adapter 40 and into an adapting elbow 48 before gluing the sight tube 42 in place. In a preferred embodiment, screen mesh disc 46A can be eliminated if the minimum cross-sectional area of sight tube 42 is smaller than the diameter of ball 44 which would make it impossible for ball 44 to escape through the bottom 43 of sight tube 42. In the latter case the shape of the sight tube 42 is such that there is a bottom surface for ball 44 to rest on with free space around said ball, so it doesn't become wedged in sight tube 42. Finally, to facilitate the feeding of liquid from the container, hose connector 50 may be threaded into the threaded end of an adapting elbow 48.

Operation of Invention

For the embodiment designed to detect low liquid level, the float 32 serves to provide an open circuit when it is floating in liquid, and a closed circuit when it is not. When liquid in a container is depleted and the magnetic float 32 is no longer supported by liquid, closure of the electrical circuit by float switch 33 allows power from battery 16 to be communicated through the pair of switch leads 30 to activate audible alarm 14 and/or energize the visual indicator 10.

When the alarm sounds, the operator of a process is compelled to put the unit into a full container of liquid as there is intentionally no way to turn the alarm off in the preferred embodiment. In practice, when the alarm sounds on a 55 gallon drum for example, the operator will prop up the drum which pools the remaining liquid around the magnetic float 32, which temporarily 'silences' the alarm. Unlike any prior art, this is possible because the cap 22 fits loosely on the drum, and gravity tends to orient the device vertically which is not possible with screwed-in or fixed-mount devices. This tilting allows a process operator time to retrieve another container of chemical.

The present invention has the liquid feeding tube 36 coupled to the sensor tube 28 thereby eliminating another common error in manufacturing which occurs when the alarm gets inserted into the drum without the liquid feeding tube, or vice versa.

By design, the length of the liquid feeding tube 36 approximately matches the depth of the magnetic float 32. This eliminates another common error which occurs when a separate suction tube is used: if the suction tube is higher than the magnetic float 32, the alarm will not sound even though the process pump is not able to pump the required liquid.

When liquid is being drawn from a container, the flow can be conveniently monitored by sighting the ball 44 through the sight tube 42. This sight tube 42 may be made from Acrylic plastic for best visibility, unless chemical compatibility is poor. The sight tube 42 is preferably constructed with a variable internal diameter so the ball 44 rises to different heights depending on the flow rate of liquid. As the invention is meant to be used with a variety of liquids which may be light, dark, clear or opaque, the ball 44 is more visible if there are two halves in contrasting colors such as black and white, rather than a ball of uniform color as is the common practice with flow indicators. This way, the random movement and rotation of the ball 44 resulting from the natural turbulence of the liquid can be easily seen. The ball 44 is prevented from escaping from either end of the sight tube 42 by the screen mesh discs 46A and 46B. The liquid may be drawn from the container by a flexible tube connected to the hose adapter 50.

Because the apparatus 8 consumes no power from battery 16 when it is not actively alarming, and because the components are chosen for low power consumption, a typical battery lifetime for the apparatus 8 is measured in years. It is therefore only necessary to access the battery infrequently by removing fasteners 20A and 20B and cover 18.

Proper functioning of the device may be checked by simply picking up the whole device so the float switch 33 is out of the liquid, which will start the alarm and/or illuminate the visual indicator 10 if everything is working properly. This provides a test of the electronics as well as the physical operation of the float 32.

Description and Operation of Alternate Embodiments

Open tanks not having access holes may also need monitoring, and so the present invention can be adapted to provide as the optional mount, instead of cap 22, a flat plate or any other shape as may be necessary to conveniently mount the rest of the previously described elements on the vessel to be monitored.

For certain situations, such as where the container is being filled rather than emptied, the invention may be equipped with the float switch 33 that closes the circuit on sensing a high liquid level instead of a low level. For such an application, the sensor tube 28 (and optionally the liquid feeding tube 36) would be shortened to the appropriate height. These modifications change the function to detect high liquid levels instead of low liquid levels.

An alternative embodiment of the invention includes an output signal indicative of the switching state of the float switch 33. This may be conveniently achieved by providing an electronics jack (not shown) on the electronics enclosure 12. Such an output signal may be used to control actions such as stopping heaters or pumps. In such cases a relay located inside the enclosure may be included if needed.

In certain situations it may be advantageous to transmit a wireless signal in addition to or in place of the audible alarm 14 and visual indicator 10. In these cases, the apparatus can be equipped with a transmitter to effect wireless communication with a distant receiver.

In some situations, it may be desirable to have the ability to silence the alarm temporarily. In such cases a button or switch which silences the alarm may be included on the exterior of the electronics enclosure 12 or elsewhere. Alternatively, one of the elements of the device could act as the off switch with a touch from the operator.

The sensor tube 28 and liquid feeding tube 36 can be made to any length as required for a specific application. Long units can be made by joining a plurality of tubes together end to end.

Thus it can be seen that the described invention provides a durable, convenient means of detecting low liquid level in containers such as 55-gallon drums and providing an alarm. Additionally it provides a means of error-proofing the feeding of liquid to a process. While the above description contains many specifics, these should not be construed as limitations on the scope of the invention, but rather as an exemplification of one preferred embodiment.

For example, the visual indicator 10 can be larger or smaller than 10 mm, or can be replaced with an LED bulb package made of many discrete LEDs in one enclosure for sunlight conditions. The material of construction can be metal, or another plastic for use with liquids that attack the PVC and acrylic of the preferred embodiment. The unit can operate using other voltages up to and including 600 volts, and can be made to plug into a wall-outlet if this is advantageous.

By eliminating the liquid feeding tube 36, sight tube 42, and hose adapter 50 and the parts connected in-between, but preserving the rest of the parts including the cap 22, the invention would not have the function of dispensing liquid at all, but would function as a level alarm only.

Although the embodiments described above are assembled from many discrete parts for the sake of economy in small manufacturing lots, the cap 22, male adapter 26, and female adapter 24 could be molded from a single piece of plastic if desired.

The apparatus may optionally have a filter or strainer at a bottom end 37 of liquid feeding tube 36 and may optionally include a check valve in line with liquid feeding tube 36.

Many other variations are possible. Therefore the scope of the invention should be determined not by the embodiment illustrated. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A removable unitary sensing assembly for a liquid container for sensing when liquid reaches a predetermined level, said unitary sensing assembly comprising:
   a) a sensor tube having an upper end and a lower end;
   b) a float switch, contained in the lower end of the sensor tube, said float switch having a first open state and a second closed state;
   c) a liquid feeding tube having a liquid inlet at its lower end and a liquid outlet at its upper end, said liquid feeding tube is in a juxtaposed relationship to said sensor tube such that the liquid inlet of said feeding tube and the lower end of said sensor tube are arranged to be disposed within a liquid container substantially at a liquid level to be sensed; and,
   d) an energizable electronic alarm attached to said upper end of said sensor tube such that said float switch activates said alarm
   wherein said float switch switches between its first and second states as liquid in the container reaches a predetermined level.

2. The removable unitary sensing assembly of claim 1 further comprising a mount arranged to be positioned within an opening of the liquid container for securing said sensor tube and said liquid feeding tube in said juxtaposed relationship such that said energizable electronic alarm and the upper end of said liquid feeding tube are exterior to the liquid container, and said lower end of said liquid feeding tube and said float swich are interior to said container.

3. The removable unitary sensing assembly of claim 1 wherein said energizable electronic alarm is activated when the liquid level reaches the predetermined level being sensed.

4. The removable unitary sensing assembly of claim 1 wherein the float switch is located at a given distance above the inlet of the liquid feeding tube such that the switch will change state in response to a change in liquid level before the liquid level reaches the predetermined level at the inlet of the liquid feeding tube.

5. The removable unitary sensing assembly of claim 1 wherein a visual indicator is attached externally near said upper end of said sensor tube and is thereby easily visible to an operator.

6. The removable unitary sensing assembly of claim 1 wherein the sensor tube and the liquid feeding are fixed to each other in the predetermined relationship.

7. The removable unitary sensing assembly of claim 1 further comprising one or more filter screens in a flow path in the liquid feeding tube.

8. The removable unitary sensing assembly of claim 1 further comprising a liquid flow rate sensor at the outlet end of the liquid feeding tube.

9. The removable unitary sensing assembly of claim 1 wherein at least one of the sensor tube and the liquid feeding tube comprise rigid pipe.

10. The removable unitary sensing assembly of claim 1 further comprising a check valve in a liquid flow path of the liquid feeding tube.

11. The removable unitary sensing assembly of claim 1 further comprising a wireless transmitter,
    wherein the a wireless signal indicative of the switch state of the float switch is emitted from the wireless transmitter.

12. The removable unitary sensing assembly of claim 1 further comprising a silencing feature
    wherein changing the state of the silencing switch deactivates the energizable electronic alarm.

13. The removable unitary sensing assembly of claim 1 wherein the energizable electronic alarm comprises an audible alarm.

14. The removable unitary sensing assembly of claim 13 wherein the visual indicator comprises a light source.

15. The removable unitary sensing assembly of claim 14 wherein the light source blinks.

16. A method of sensing the liquid level in a container comprising the steps of:
    a) placing in the liquid of the container a removable unitary sensing assembly comprising:
       i) a sensor tube having an upper end and a lower end;
       ii) a float switch, contained in the lower end of the sensor tube, said float switch having a first open state and a second closed state;
       iii) a liquid feeding tube having a liquid inlet at its lower end and a liquid outlet at its upper end, said liquid feeding tube is in a juxtaposed relationship to said sensor tube such that the liquid inlet of said feeding tube and the lower end of said sensor tube are arranged to be disposed within a liquid container substantially at a liquid level to be sensed; and,
       iv) an energizable electronic alarm attached to said upper end of said sensor tube such that said float switch activates said alarm;
    b) removing liquid from the container via the liquid feeding tube; and
    c) using an output from the energizable electronic alarm to alert an operator that the liquid in the container is at a predetermined level.

* * * * *